May 13, 1924.
W. W. TURNBULL
1,493,575
MACHINE FOR MAKING ICE CREAM CONES
Filed March 23, 1921   2 Sheets-Sheet 1
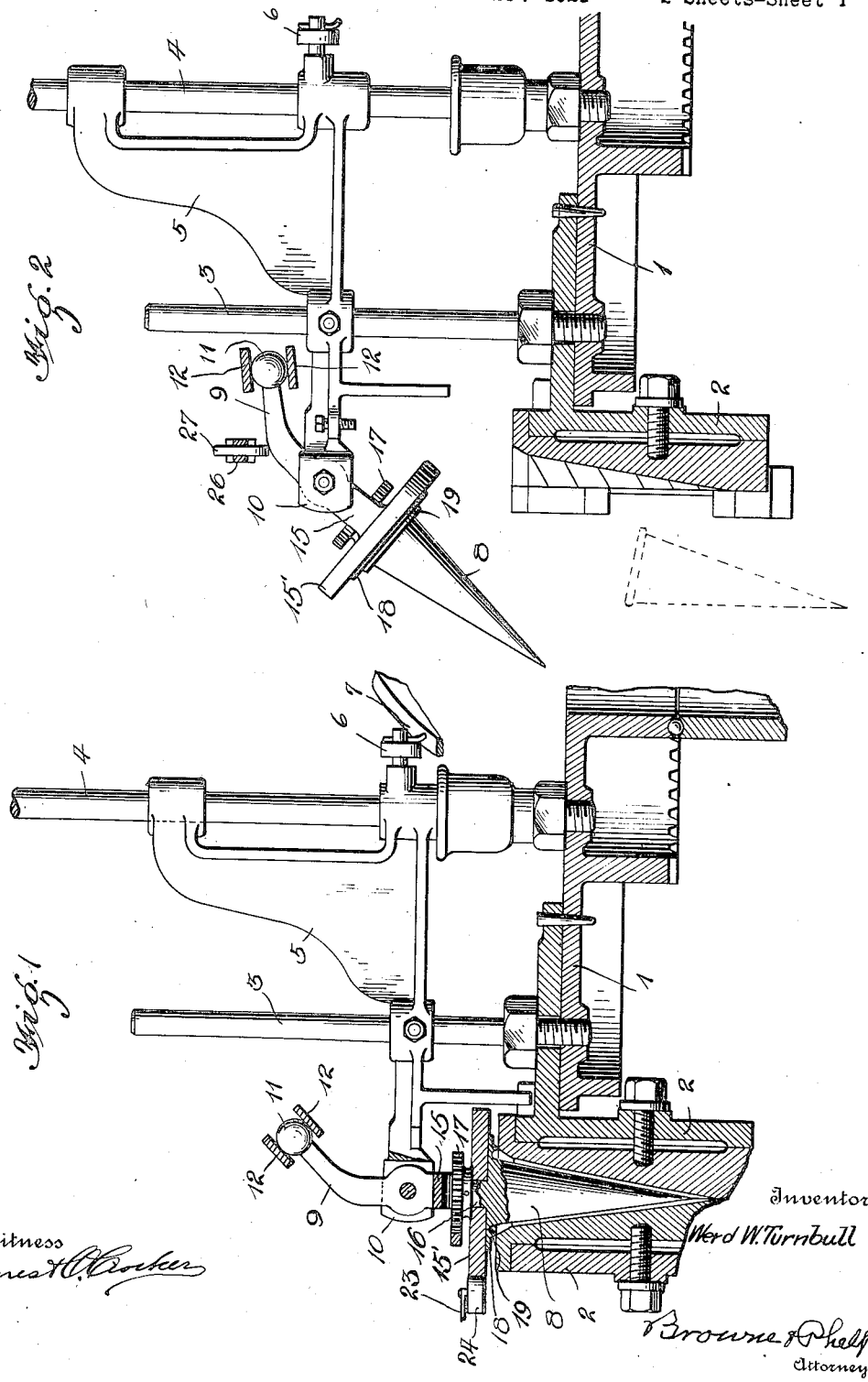
Inventor
Werd W. Turnbull
Witness
Ernest A. Crocker
Browne & Phelps
Attorneys May 13, 1924.
W. W. TURNBULL
1,493,575
MACHINE FOR MAKING ICE CREAM CONES
Filed March 23, 1921    2 Sheets-Sheet 2
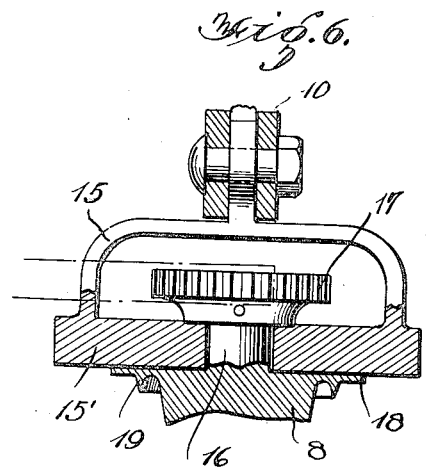
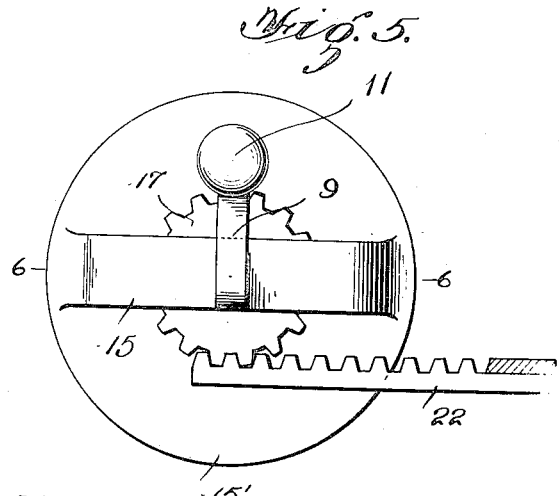
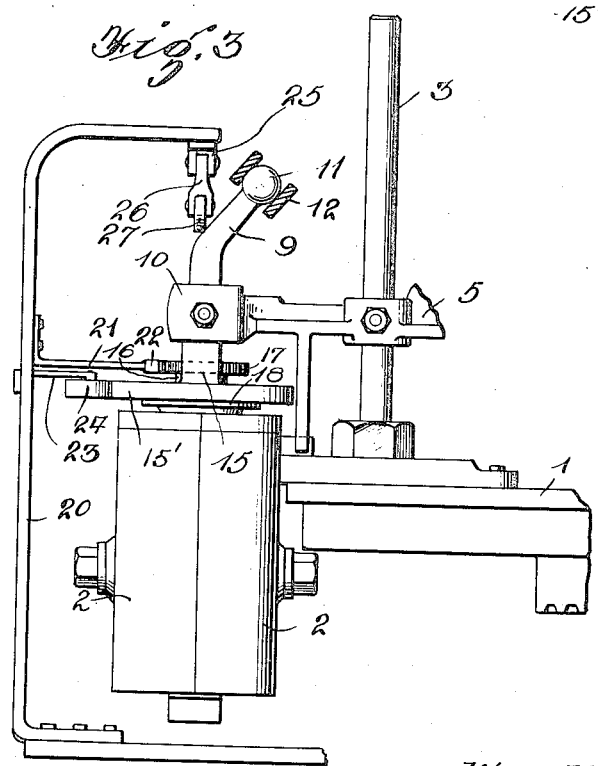
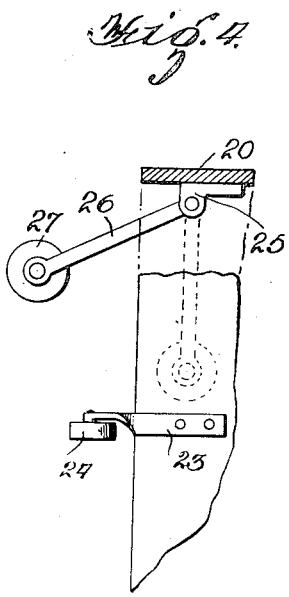
Inventor
Werd W. Turnbull
By Browne & Phelps
Attorneys
Witness
Ernest O. Crocker Patented May 13, 1924.

1,493,575

UNITED STATES PATENT OFFICE.

WERD W. TURNBULL, OF CHATTANOOGA, TENNESSEE.

MACHINE FOR MAKING ICE-CREAM CONES.

Application filed March 23, 1921. Serial No. 454,630.

*To all whom it may concern:*

Be it known that I, WERD W. TURNBULL, a citizen of the United States, residing at Chattanooga, in the county of Hamilton and State of Tennessee, have invented certain new and useful Improvements in Machines for Making Ice-Cream Cones, of which the following is a specification.

This invention relates to machines for making ice cream cones, and for the sake of illustration I have shown my invention as applied to machines of the type shown in my prior Patents Nos. 1,299,635, patented April 8, 1919, and 1,302,733, patented May 6, 1919.

It is to be understood however that while my present invention is particularly adapted to machines of the type disclosed in the patents referred to, it is not limited to such use, but may be used in connection with machines of other and different types.

The present invention specifically relates to a means for freeing the baked cone from the mold and the core to enable it to be readily discharged from the mold without danger of the cone sticking to either the mold or core.

A further object of my invention is to provide a means for trimming the edges of the cone as it is freed from the mold and the core.

With the foregoing and other objects in view, my invention consists in certain constructions, combinations and arrangements of parts, the preferred form of which will be first described in connection with the accompanying drawings and then the invention particularly pointed out in the appended claims.

Referring to the drawings wherein the same part is designated by the same reference numeral wherever it occurs—

Figure 1 is a sectional elevation through a mold and parts adjacent the same, showing the mold closed and the core within the mold;

Fig. 2 is a similar view showing the mold opened and the core withdrawn so as to eject the baked cone;

Fig. 3 is a detailed elevational view of the parts in the position shown in Fig. 1, with a portion of the hood illustrated to show the core operating mechanism;

Fig. 4 is a detail view showing the position of certain rollers which function in connection with the operation of the core;

Fig. 5 is a top plan view of a top of a core and its operating mechanism, and

Fig. 6 is a detail elevation partly in section of the means for supporting one of the cones.

In the drawings I have only illustrated so much of a machine of the type shown in my patents above referred to as to enable any one skilled in the art to understand my invention, and therefore this application should be read in connection with said patents.

1 indicates a carrier upon which is mounted a plurality of molds 2, only one of which is shown in the drawings. The carrier is caused to rotate about a vertical axis so as to cause the molds to move successively past mixing, feeding and cooking means.

Upon the carrier for the molds and traveling therewith are mounted pairs of guides or posts 3 and 4, one pair for each mold and upon which are slidably mounted arms 5, which carry the cores, each of said arms 5 being provided at its inner end with a roller or pin 6 adapted to travel on a cam track 7, whereby the arms 5 will be raised so as to move the core to a position above the mold, the cam track 7 being so shaped or of such length that, after a fresh batch of dough has been placed in the mold the core 8 will be restored or caused to return to its former position therein.

The mold as set forth in my prior patents referred to is composed of mating members secured within a holder which also consists of mating members hingedly connected so that the outer member may at the proper time swing toward or away from the inner member. The cores 8 are mounted at the outer ends of the arm 5 and in the present arrangement each core is carried by an upwardly extending handle member or lever 9, which is pivoted within a yoke or bifurcation 10, at the outer end of the core-carrying arm 5. The handle member or lever 9 is curved inwardly toward its free end as clearly shown in the drawings, and at such free end is constructed with a ball or knob 11, which is adapted to ride between the rails 12 forming the stationary cam track. This cam track 12 is so disposed that as the arm 5 is raised by the member 6 at its inner end rotating on the track 7 the free end of the lever or handle member 9 will be swung downwardly or inwardly toward the guide post 3, the core being thereby swung upward and outward.

The lower end of the arm 9 below the pivot point 10 is formed into a yoke 15 supporting a head 15′ through the center of which extends a stub shaft 16 formed on the upper end of the core 8. Secured to the stub shaft 16 above the head 15′ is a gear 17 whereby the core is supported by the head 15′ but free to revolve in relation thereto.

The upper end of the core is provided with an outwardly extending flange 18 the upper side of which rests against the under side of the head 15′. The under side of this flange 18 carries a cutting rib 19 adapted to trim off the end of the finished cone as will be further set forth.

20 is a hood secured to the frame of the machine and extending up and around the path of movement of the molds. This hood has secured thereto an arm 21 carrying a rack 22 which is adapted to engage the gear 17 as the mold moves past the rack, thus rotating the core 8 through the medium of the gear 17. The hood 20 also carries an arm 23 preferably formed of spring steel on which is mounted a roller 24 in position to rest against the periphery of the head 15′ during a portion of the time the rack 22 is rotating the core 8, so as to hold the core 8 against the back half of the mold.

The purpose of this engagement between the roller 24 and the core head 15′ is to hold the core 8 against the back half of the mold, as the front half of the mold opens, during the latter part of and just after the rotation of the core, and during the first portion of its upward movement, until during the ejecting operation the lift of the various parts disengages the roller 24 and the core head 15′. Were it not for this holding in feature the liability of breakage of the partly released cone would be very great.

On the under side of the hood 20 is mounted a bracket 25 carrying a freely swinging arm 26 upon which is positioned a roller 27 projecting into the path of travel of the core handle members 9 at a point in such travel where the ejecting and lifting movement is commenced. By contacting with these handle members 9 during their travel past this point the roller 27 rests for a short period upon each handle 9 and by the weight of such roller 27 and its carrying arm 26 commences the pivotal movement of the core 8 by depressing its handle member 9 until it moves past and places the knob 11 in engagement with the cam track 12.

In the operation of the machine the parts are so located that the core 8 will be started to rotate by the engagements of the rack 22 with the gear 17; then the mold unlocked and the front half opened, the core being held against the back of the mold by roller 24; then the core 8 raised by the cam 7, then the core swung outwardly by the roller 27 and its arm 26 and into cam tracks 12 engaging the head 11 to the position shown in Fig. 2, when the cone is delivered.

It will thus be seen that the rotating of the core 8 will trim the mouth of the cone and the lifting movement, in combination with the rotation and backward pressure of the core, thus causing a wiping effect, will cause the core to free itself from the finished cone, due to the fact that the cone can not move upward along the back of the mold because of the scorings in the mold, and that after the core has been rotated and lifted a fraction of its total movement it is then swung out by the roller 27 and its arm 26, causing the ball 11 of the arm 9 to engage the cam tracks 12, thus freeing the cone from the back of the mold and permitting it to drop away from the core.

Considerable variation of the details as described herein may be resorted to without departure from the spirit of the invention, which is to be construed in the light of the following claims.

What I claim as new and desire to secure by Letters Patent is:

1. In an ice cream cone machine the combination with a mold consisting of relatively movable members, of a core adapted to fit within the mold and mounted for vertical movement, means for moving one member of the mold relative to the other member, and means for holding the core against the stationary member of the mold during a portion of its upward travel.

2. In an ice cream cone machine the combination with a mold consisting of relatively movable members, of a core adapted to fit within the mold and mounted for vertical movement, means for rotating the core, means for moving one of said mold members, and means for holding the core against the stationary member of the mold during the rotation of said core.

3. In an ice cream cone machine the combination with a mold consisting of relatively movable members, of a core adapted to fit within the mold and mounted for vertical movement, means for rotating the core, means for moving one of said mold members, means carried by said core for trimming said cone, and means for holding the core against the stationary member of the mold during the rotation of said core.

4. In an ice cream cone machine the combination with a mold consisting of relatively movable members, of a core adapted to fit within the mold and mounted for vertical and rotatory movements, means for rotating the core, means for lifting the core and means for pressing the core toward one of the mold members during a time when it is being simultaneously rotated and lifted.

5. In an ice cream cone machine the combination with a mold consisting of relatively movable members, a core adapted to fit within the mold and mounted for vertical movement, means for lifting the core, and means for pressing the core against one of the mold members during a portion of the lifting movement of said core whereby to strip the cone therefrom.

6. In an ice cream cone machine the combination with a mold consisting of relatively movable members, a core adapted to fit within the mold and mounted for vertical movement, means for lifting the core, and means for pressing the core against one of the mold members when the mold is open and during a portion of the lifting movement of said core whereby to strip the cone therefrom.

In testimony whereof I affix my signature hereto.

WERD W. TURNBULL.